(12) United States Patent
Bich (10) Patent No.: US 10,721,862 B2
(45) Date of Patent: Jul. 28, 2020

(54) CUTTER ASSEMBLY FOR AN AGRICULTURAL HARVESTER

(71) Applicant: CNH America LLC, New Holland, PA (US)

(72) Inventor: Seth Michael Bich, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 599 days.

(21) Appl. No.: 14/107,397

(22) Filed: Dec. 16, 2013

(65) Prior Publication Data

US 2015/0163994 A1 Jun. 18, 2015

(51) Int. Cl.
| | | |
|---|---|---|
| *A01D 34/14* | (2006.01) | |
| *A01D 34/02* | (2006.01) | |
| *A01D 34/30* | (2006.01) | |
| *A01D 34/03* | (2006.01) | |
| *A01D 34/13* | (2006.01) | |

(52) U.S. Cl.
CPC ............ *A01D 34/14* (2013.01); *A01D 34/02* (2013.01); *A01D 34/03* (2013.01); *A01D 34/13* (2013.01); *A01D 34/305* (2013.01)

(58) Field of Classification Search
CPC .... A01D 34/135; A01D 34/145; A01D 34/14; A01D 34/02; A01D 34/13; A01D 34/30; A01D 34/305; A01D 34/32; A01D 34/33; A01D 34/34
USPC .......................................... 56/297, 259, 299
See application file for complete search history.

(56) References Cited

U.S. PATENT DOCUMENTS

| | | | | |
|---|---|---|---|---|
| 105,111 A | * | 7/1870 | Mewes ................ | A01D 34/135 56/297 |
| 129,357 A | * | 7/1872 | Mewes ................ | A01D 34/135 56/297 |
| 264,511 A | * | 9/1882 | Brown ...................... | F04B 9/02 56/297 |
| 384,712 A | * | 6/1888 | Quilliam .............. | A01D 34/135 56/297 |

(Continued)

FOREIGN PATENT DOCUMENTS

| | | |
|---|---|---|
| DE | 2444173 A1 | 3/1976 |
| WO | 2012/174530 A1 | 12/2012 |

(Continued)

OTHER PUBLICATIONS

EP Application No. 14197366, Response to Invitation Pursuant to Rule 70a(1) EPC, filed Sep. 30, 2015, 25 pages.

(Continued)

*Primary Examiner* — Thomas B Will
*Assistant Examiner* — Joan D Misa
(74) *Attorney, Agent, or Firm* — Peter Zacharias; Patrick Sheldrake (57) ABSTRACT

An improved cutter assembly for use with a header of an agricultural harvester is provided. The assembly includes a pair of oppositely directed knife blades or cutter bars and a center knife drive. A crank shaft drives both knife blades in linear reciprocating paths with no fore and aft movement. As a consequence, harmful fore and aft vibration is eliminated. The assembly is simple and durable in design, less susceptible to vibration-induced wear and tear, and comparatively simple to manufacture and repair.

9 Claims, 7 Drawing Sheets

(56) References Cited

U.S. PATENT DOCUMENTS

| | | | | |
|---|---|---|---|---|
| 385,272 | A | * | 6/1888 | Johnson .................. A01D 34/02 56/259 |
| 671,024 | A | | 4/1901 | Long |
| 738,033 | A | * | 9/1903 | Haynes ................ A01D 34/135 56/297 |
| 1,017,863 | A | * | 2/1912 | Fulton .................. A01D 34/135 56/297 |
| 1,281,825 | A | * | 10/1918 | Pearson ............... A01D 34/145 29/891 |
| 1,647,867 | A | | 11/1927 | Hutsell |
| 1,724,300 | A | * | 8/1929 | Moncreiffe ............. A01D 57/20 56/124 |
| 2,156,009 | A | | 4/1939 | Calcaterra et al. |
| 2,157,041 | A | * | 5/1939 | Wagner ................. A01D 34/08 56/17.6 |
| 2,553,523 | A | | 5/1951 | Wright |
| 2,736,156 | A | | 2/1956 | Hardman |
| 2,808,696 | A | * | 10/1957 | Hall ..................... A01D 34/305 56/296 |
| 3,517,494 | A | * | 6/1970 | Beusink ................ A01D 34/30 56/293 |
| 3,897,630 | A | * | 8/1975 | Glover ................... A01G 3/053 30/220 |
| 4,023,334 | A | | 5/1977 | Heath |
| 4,067,179 | A | * | 1/1978 | Schneider ............. A01D 34/30 56/297 |
| 4,246,742 | A | * | 1/1981 | Clark .................. A01D 34/135 56/259 |
| 4,446,683 | A | | 5/1984 | Rempel et al. |
| 4,567,864 | A | | 2/1986 | Gaspardo |
| 4,866,921 | A | * | 9/1989 | Nagashima ............ A01D 34/30 56/257 |
| 4,901,512 | A | * | 2/1990 | Castoldi ................ A01D 34/13 56/293 |
| 4,909,025 | A | * | 3/1990 | Reissig ................. A01D 34/305 56/257 |
| 5,497,605 | A | * | 3/1996 | Underwood ........... A01D 34/30 460/101 |
| 6,263,579 | B1 | * | 7/2001 | Nagashima ............ A01G 3/053 30/216 |
| 6,314,707 | B1 | | 11/2001 | Ryan |
| 6,698,177 | B1 | * | 3/2004 | Akehi .................... B21D 53/28 56/236 |
| 6,889,492 | B1 | * | 5/2005 | Polk ..................... A01D 41/142 56/257 |
| 7,401,458 | B2 | * | 7/2008 | Priepke ................ A01D 34/145 56/296 |
| 7,520,118 | B1 | * | 4/2009 | Priepke .................. A01D 34/30 56/257 |
| 7,730,709 | B2 | * | 6/2010 | Priepke .................. A01D 34/30 56/257 |
| 7,757,405 | B2 | * | 7/2010 | Peterson ................ A01G 3/053 30/216 |
| 7,788,811 | B2 | * | 9/2010 | Hanada .................. A01G 3/053 30/210 |
| 7,805,919 | B2 | * | 10/2010 | Priepke .................. A01D 34/30 56/257 |
| 8,011,272 | B1 | * | 9/2011 | Bich .................... A01D 34/305 56/299 |
| 8,151,547 | B2 | | 4/2012 | Bich et al. |
| 8,397,389 | B2 | * | 3/2013 | Geromiller ............ A01G 3/053 30/208 |
| 8,973,345 | B2 | * | 3/2015 | Brimeyer ............... A01D 34/30 56/257 |

FOREIGN PATENT DOCUMENTS

| | | | | |
|---|---|---|---|---|
| WO | WO 2012166666 A1 | * | 12/2012 | ........... A01D 34/145 |
| WO | WO 2012166672 A1 | * | 12/2012 | ............. A01D 34/30 |
| WO | 2013053351 A1 | | 4/2013 | |

OTHER PUBLICATIONS

EP Application No. 14197366, European Search Report, dated May 26, 2015, 7 pages.

* cited by examiner

CUTTER ASSEMBLY FOR AN AGRICULTURAL HARVESTER

BACKGROUND

The subject application relates generally to headers for agricultural harvesters. In particular, the subject application relates to a header including an improved harvester cutter assembly for driving oppositely directed knife blades in linear reciprocating or oscillating fashion.

Agricultural harvesters such as combine harvesters are well known apparatuses for harvesting grain crops. An agricultural harvester is typically a self-propelled vehicle which includes a feederhouse and mechanisms downstream of the feederhouse for separating grain from other crop material. A header is attached to the front of the harvester and includes mechanisms for cutting crop, gathering crop and delivering crop to the harvester's feederhouse. A typical crop cutter includes a stationary knife and a moving knife which together act as shears that cut crop near the ground. After cutting, the crop is gathered, e.g., by a harvesting reel which feeds the cut crop to a conveyor system that transports the cut crop to the harvester's feederhouse.

Typical agricultural harvester cutter assemblies include a pair of oppositely directed knife blades each of which are formed from a plurality of sickle sections that are secured to a knife back. Each knife back, in turn, is connected to a knife drive. In conventional cutter assemblies the knife blades are pivotably connected to the knife drives whereby the knife drives propel the knife blades through a non-linear, arc-like path of motion. In traversing the arc, the knife blades move not only from side to side (i.e., transverse to the direction of movement of the harvester) but also fore and aft (i.e., in the direction of movement of the harvester). The fore and aft motion of the knife blades results in forward and rearward vibration being introduced into the cutter assemblies which adds additional stresses on the knife blades and detrimentally affects the service life of the knife drives.

In addition, the sickle knife drives of current agricultural harvesters are complex in construction with many moving parts including multiple crank shafts and gears. In a typical arrangement, at least one crank shaft and gear is required to drive each knife blade and the interaction of these components must be carefully coordinated in order to move the knife blades in synchronicity. The complexity of such knife drives renders them difficult and costly to manufacture and repair while increasing their susceptibility to failure, which can deleteriously impact harvesting productivity.

BRIEF SUMMARY

In accordance with a first aspect, the subject application provides a cutter assembly for an agricultural harvester header. The cutter assembly addresses the problems of vibration and undue design complexity by virtue of a robust yet simple construction. The subject application is directed to a cutter assembly having a sickle knife drive that uses a single crank shaft and flywheel to linearly oscillate or reciprocate a pair of sickle knife blades or cutter bars in simple harmonic motion. The knife blades or cutter bars are coaxially arranged and oppositely directed, and their linear reciprocation in a side to side direction eliminates fore and aft motion and corresponding fore and aft vibration which can be harmful to the knife drives. Since the motion of the knife blades or cutter bars is strictly linear and in opposite directions along a common reciprocation axis that is transverse to a direction of travel of the harvester, vibrational forces are minimized.

In accordance with a second aspect, the subject application provides a cutter assembly for an agricultural harvester header including a knife drive, and first and second cutter bars connected to the knife drive in side by side relation. The knife drive includes a crank shaft having a first cylindrical portion and a second cylindrical portion radially offset from the first cylindrical portion. A first eccentric sheave is mounted on the first cylindrical portion and a first eccentric rod extends from the first eccentric sheave. Likewise, a second eccentric sheave is mounted on the second cylindrical portion and a second eccentric rod extends from the second eccentric sheave. The first cutter bar is attached to a distal end of the first eccentric rod and the second cutter bar is attached to a distal end of the second eccentric rod. Rotation of the crank shaft provides linear oscillation of the first and second cutter bars.

In accordance with a third aspect, the subject application provides a sickle knife drive for an agricultural harvester header. The sickle knife drive includes a housing, a crank shaft having first and second cams rotatably supported by the housing, first and second connecting members, and first and second plungers. The first and second connecting members each have first and second ends. The first end of the first connecting member has a first cam follower for engaging the first cam and the first end of the second connecting member has a second cam follower for engaging the second cam. The first and second plungers each have first and second ends. The first plunger is supported for linear motion at a first end of the housing and the second plunger is supported for linear motion at a second end of the housing opposite the first end. The first plunger is connected at the first end thereof to the second end of the first connecting member and the second end thereof to a first sickle knife assembly. The second plunger is connected at the first end thereof to the second end of the second connecting member and the second end thereof to a second sickle knife assembly. With the sickle knife drive being so constructed, rotation of the crank shaft causes rotation of the first and second cams against the first and second cam followers and linear reciprocating motion of the first and second plungers in opposite directions.

In accordance with a fourth aspect, the subject application provides a drive mechanism for center knife drive of an agricultural harvester header. The drive mechanism includes a crank shaft having a first end and a second end opposite the first end, a flywheel gear, and first and second eccentric journals having outer cam surfaces. The first eccentric journal is eccentrically arranged with respect to a rotational axis of the crank shaft and proximate the first end of the crank shaft. The second eccentric journal is eccentrically arranged with respect to the rotational axis of the crank shaft and adjacent the first eccentric journal. The flywheel gear is coaxial with the rotational axis of the crank shaft and adjacent the second eccentric journal for operatively engaging a driven input gear. The outer cam surfaces of the first and second eccentric journals furthest from the rotational axis of the crank shaft are angularly offset from each other.

In accordance with a fifth aspect, the subject application provides a drive mechanism for center knife drive of an agricultural harvester header. The drive mechanism includes a first connecting member and a second connecting member. The first connecting member has a first end adapted for receiving a first eccentric journal carried by a rotatable crank shaft and a second end operably connected to a first plunger. The second connecting member has a first end adapted for receiving a second eccentric journal carried by the rotatable crank shaft and a second end operably connected to a second plunger. The first and second plungers are coaxial and configured to reciprocate in opposite directions when driven by rotation of the crank shaft.

BRIEF DESCRIPTION OF THE SEVERAL VIEWS OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown.

In the drawings.

DETAILED DESCRIPTION

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

Figure 1:
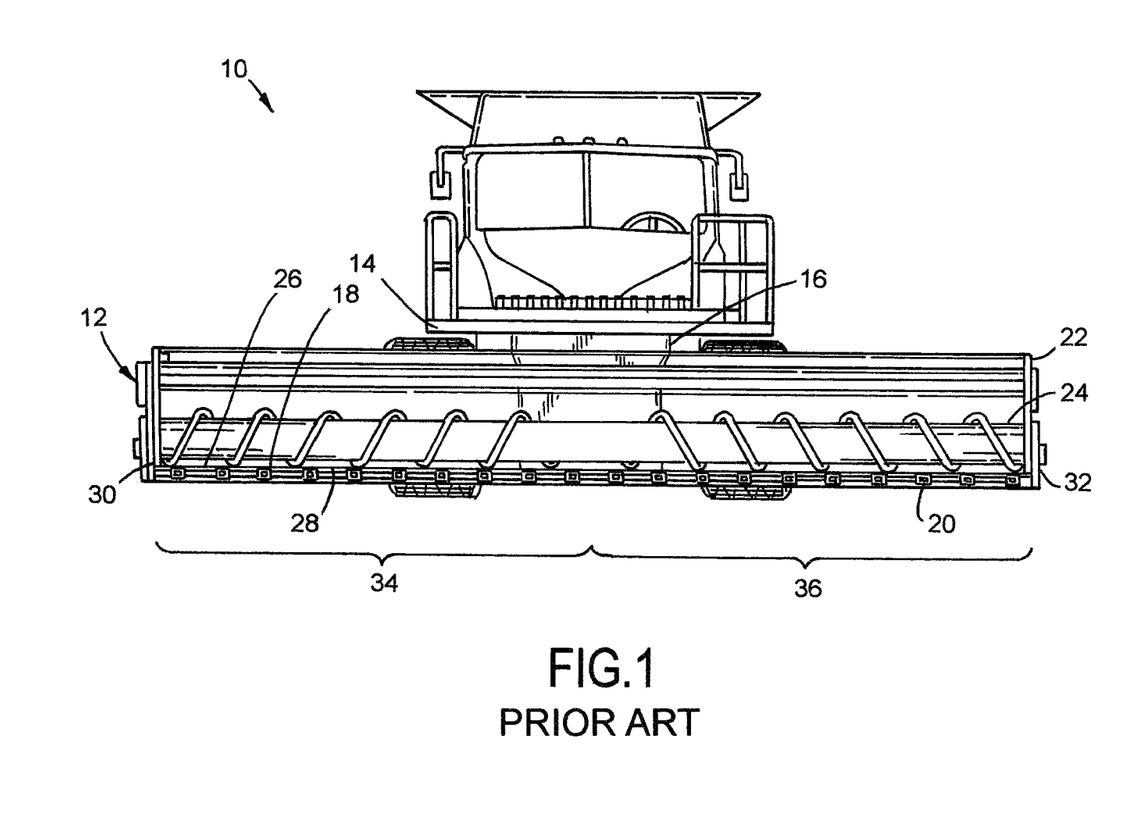
FIG. 1 is front elevation view of a conventional agricultural harvester including a header.

Referring now to the drawings, wherein aspects of the subject application are shown, FIG. 1 illustrates a conventional agricultural harvester 10 such as a combine. Harvester 10 includes a header 12 which is attached to a forward end 14 of the harvester and which is configured to cut crops and to induct the cut crops into a feederhouse 16 as harvester 10 moves forward over a crop field.

Header 12 includes a floor 18 that is supported in desired proximity to the surface of a crop field and an elongate sickle assembly 20 that extends transversely along a forward edge of the floor 18 i.e., in a widthwise direction of the harvester. Sickle assembly 20 is configured to cut crops in preparation for induction into the feederhouse 16. Additionally, header 12 includes an elongate, transversely extending harvesting reel 22 disposed above sickle 20. Harvesting reel 22 is rotatable in a direction suitable for facilitating the induction of cut crops into feederhouse 16. Header 12 further includes an elongate, rotatable auger 24 which extends in close proximity to a top surface 26 of floor 18. Auger 24 is configured to cooperate with harvesting reel 22 in conveying cut crops to feederhouse 16, which is configured to convey the cut crops into harvester 10 for threshing and cleaning. While the foregoing aspect of the subject application is being described with respect to a draper header, the cutter assembly of the subject application can be applied to any other header having use for a knife assembly or sickle section.

Sickle assembly 20 extends along a forward edge 28 of floor 18, and generally is bounded by a first side edge 30 and an opposing second side edge 32 of floor 18. Sickle assembly 20 can be configured to include a first movable knife assembly 34 and a second movable knife assembly 36 (along with an unillustrated stationary knife). The mechanisms of such knife assemblies are known in the art and a typical mechanism is disclosed in U.S. Pat. No. 8,151,547, the entire disclosure of which is incorporated by reference herein.

Figure 2:
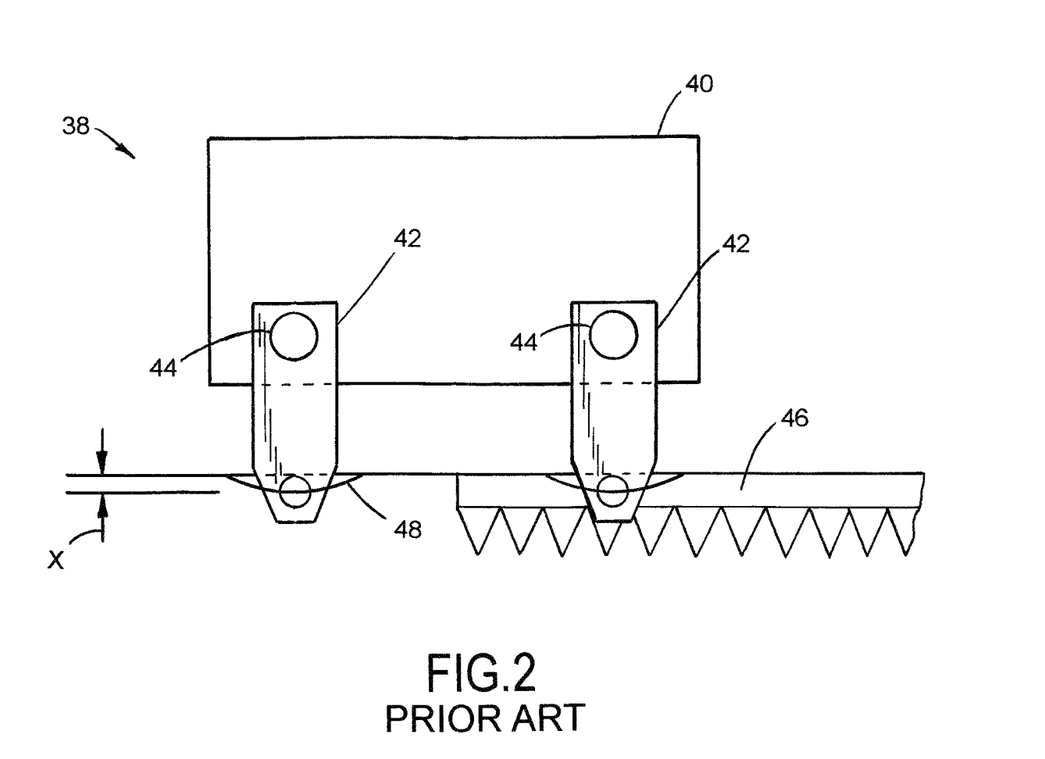
FIG. 2 is a top plan schematic view of a conventional knife drive applicable to the header of FIG. 1.

Referring to FIG. 2, there is schematically depicted a conventional sickle knife drive 38 revealing the path of motion imposed by the knife drive on a pair of oppositely directed movable knives or cutter bars. For simplicity and clarity of illustration, the crank shafts and drive gears of sickle knife drive 38 are omitted. As is known in such knife drives, at least one crank shaft is associated with each movable knife blade or cutter bar. That is, each knife or cutter bar has its own crank shaft where at least two separate crank shafts are required to move the pair of knives. The knife drive 38 includes a housing 40 in which first and second members 42 are supported for pivoting motion at pivot points 44. A first end of each member 42 is operably driven by an unillustrated crank shaft and a second end of each member 42 is connected to a movable knife 46 (only one of which is shown in FIG. 2). As each member 42 pivots, it swings its respective movable knife 46 through an arcuate path 48. In so doing, the knives travel not only from side to side (i.e., transverse to the direction of movement of the harvester) but also fore and aft (i.e., in the direction of movement of the harvester). The distance the movable knives travel in the fore and aft direction is indicated by reference "X". By traveling in the fore and aft direction as well as side to side directions, the movable knives 46 introduce fore and aft vibration into the system. Such vibration not only stresses the knives themselves but also exerts detrimental forces on the moving parts of knife drive assembly, e.g., the crank shafts and gears. As will be appreciated, the fore and aft vibration created by the pivoting knives eventually leads to accelerated failure of the knife drive over time.

Figure 3:
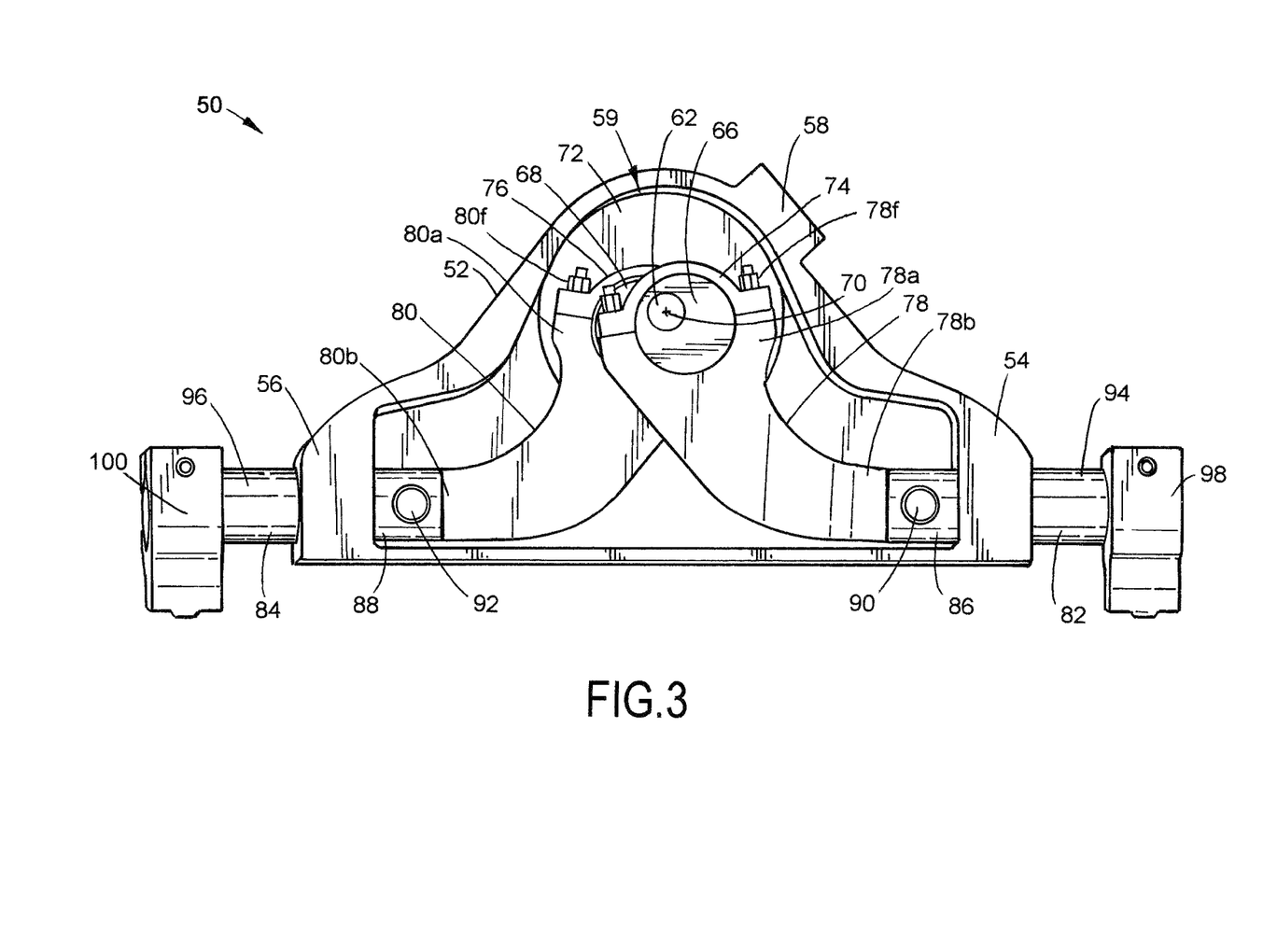
FIG. 3 is a top plan view of a knife drive of a cutter assembly according to an aspect of the subject application in fully extended position.
Figure 4:
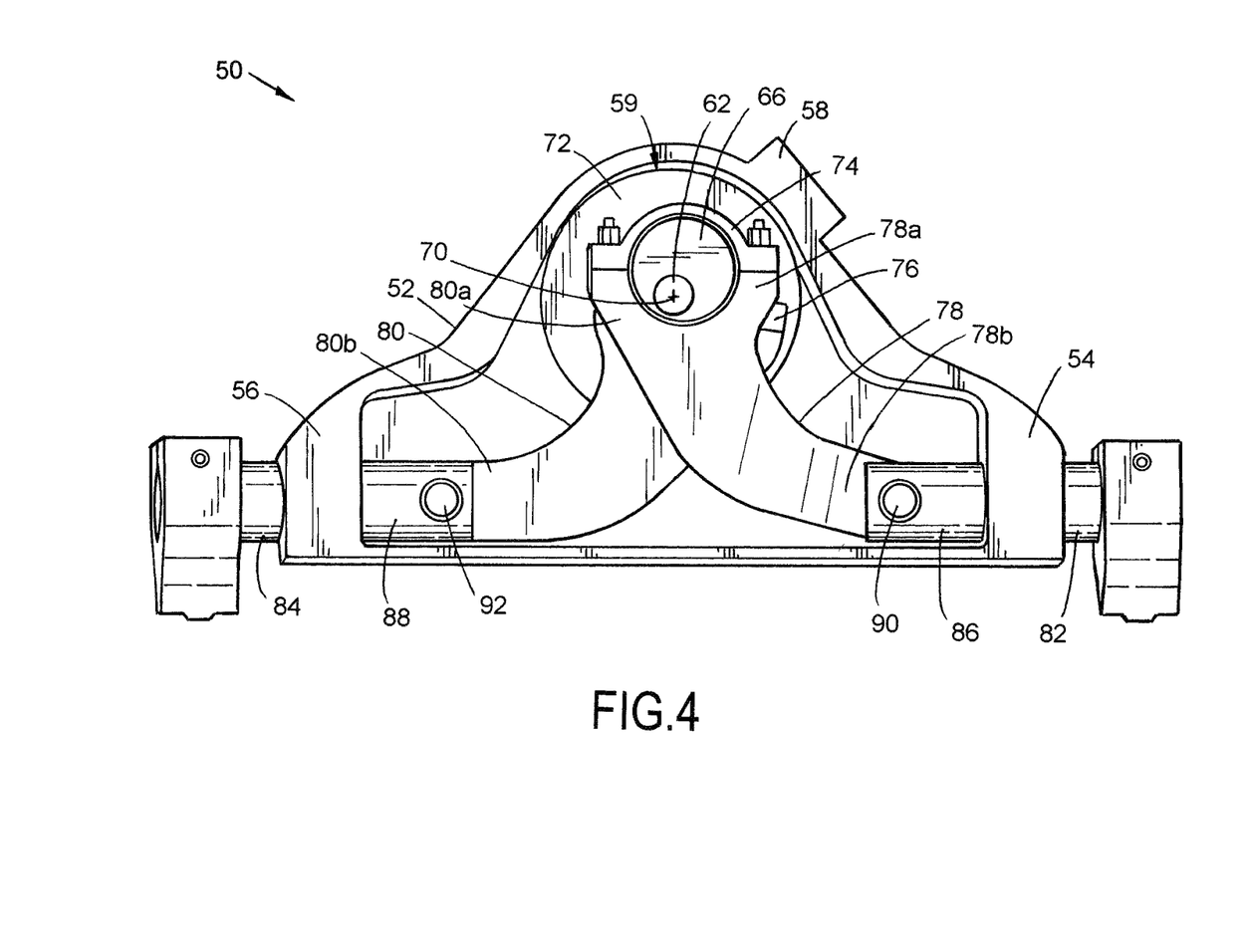
FIG. 4 is a top plan view of the knife drive of FIG. 3 in fully retracted position.
Figure 5:
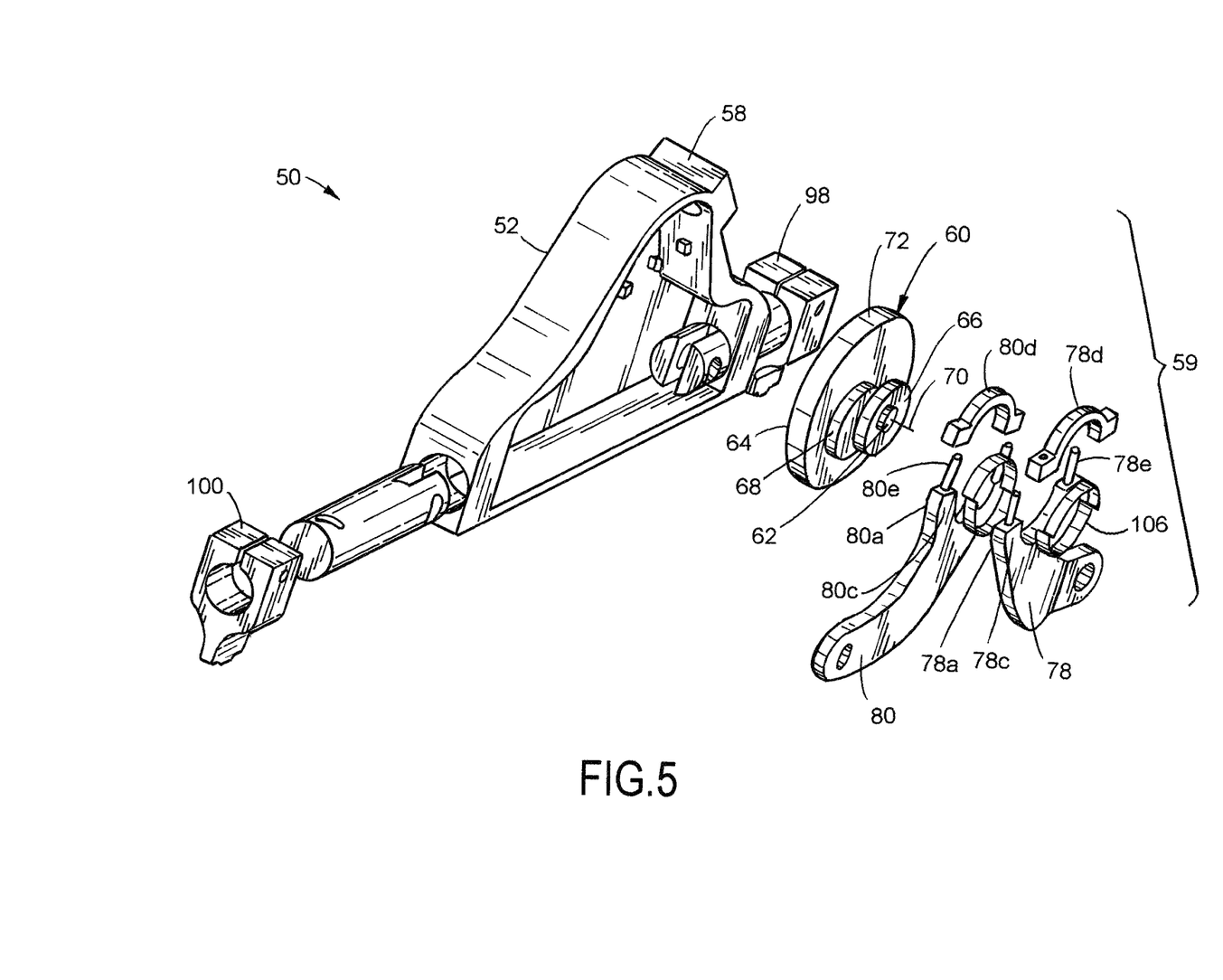
FIG. 5 is an exploded perspective view of the knife drive of FIG. 3.

Referring to FIGS. 3-5, there are shown several views of a centrally located or "center" knife drive 50 for a cutter assembly of an agricultural header pursuant to an aspect of the subject application. The knife drive includes a housing 52 including first and second opposite ends 54, 56 and an opening 58 for receiving a geared input shaft which will be described in greater detail in connection with FIGS. 8 and 9.

Knife drive 50 also includes a knife blade or cutter bar drive mechanism 59 for moving the cutter bars or knife blades in simple harmonic motion.

As best shown in FIG. 5, the drive mechanism 59 includes a crank shaft 60 having first and second opposite ends 62, 64. The crank shaft 60 further includes first and second journals 66, 68 that are eccentric with respect to a crank shaft rotation axis 70 (i.e., an eccentric journal) and angularly offset in the manner described in connection with FIG. 6. The first and second journals function as cams as described in detail hereinafter. The first journal can be configured as a cylindrical portion 66 located proximate the first end 62 of the crank shaft 60 and the second journal can be configured as a cylindrical portion 68 located adjacent the first cylindrical portion 66. Thus, the first and second cylindrical portions are angularly offset from each other such as about 90 to 180 degrees. However, the angular offset can be more or less than 90 to 180 degrees, such as 70, 80, 100, 110, 120, 130, 140, 160, 170, 190 and 200 degrees. Referring to FIG. 5, the crank shaft further includes a flywheel 72 located adjacent the second journal 68 and coaxial with the crank shaft rotation axis 70 for operatively engaging a driven input gear, as set forth in FIGS. 7-9. The outer cam surfaces of the first and second journal portions 66, 68 furthest from the rotational axis 70 of the crankshaft 60 are angularly offset from each other, and preferably angularly offset by about 90 to 180 degrees, but can alternatively be angularly offset more than 180 or less than 90, such as 100-170 degrees or 80-190 degrees.

Referring to FIG. 3, at will be seen that the drive mechanism 59 further includes first and second eccentric sheaves 74, 76 respectively mounted on the first and second journals 66, 68 with eccentric rods or connecting members 78, 80 respectively extending in first and second opposite directions from the first and second eccentric sheaves 74, 76. A first or proximal end 78*a* of the first connecting member is mounted on or otherwise engaged with the first journal 66 and a first or proximal end 80*a* of the second connecting member is mounted on or otherwise engaged with the second journal 68. The second or distal ends 78*b*, 80*b* of the first and second connecting members 78, 80 extend in first and second opposite directions toward the first and second opposite ends 54, 56 of housing 52. That is, first connecting member 78 is engaged with the first journal 66 and extends in a first direction, and second connecting member 80 is engaged with the second journal 68 and extends in a second direction opposite the first direction such that rotation of the crank shaft 70 produces linear reciprocating motion of the ends of the first and second connecting members. As represented in FIGS. 3-6, the linear reciprocating motion of the end of the first connecting member 78 is in a direction opposite the linear reciprocating motion of the end of the first connecting member 80.

Figures 7, 8, 9, 10:
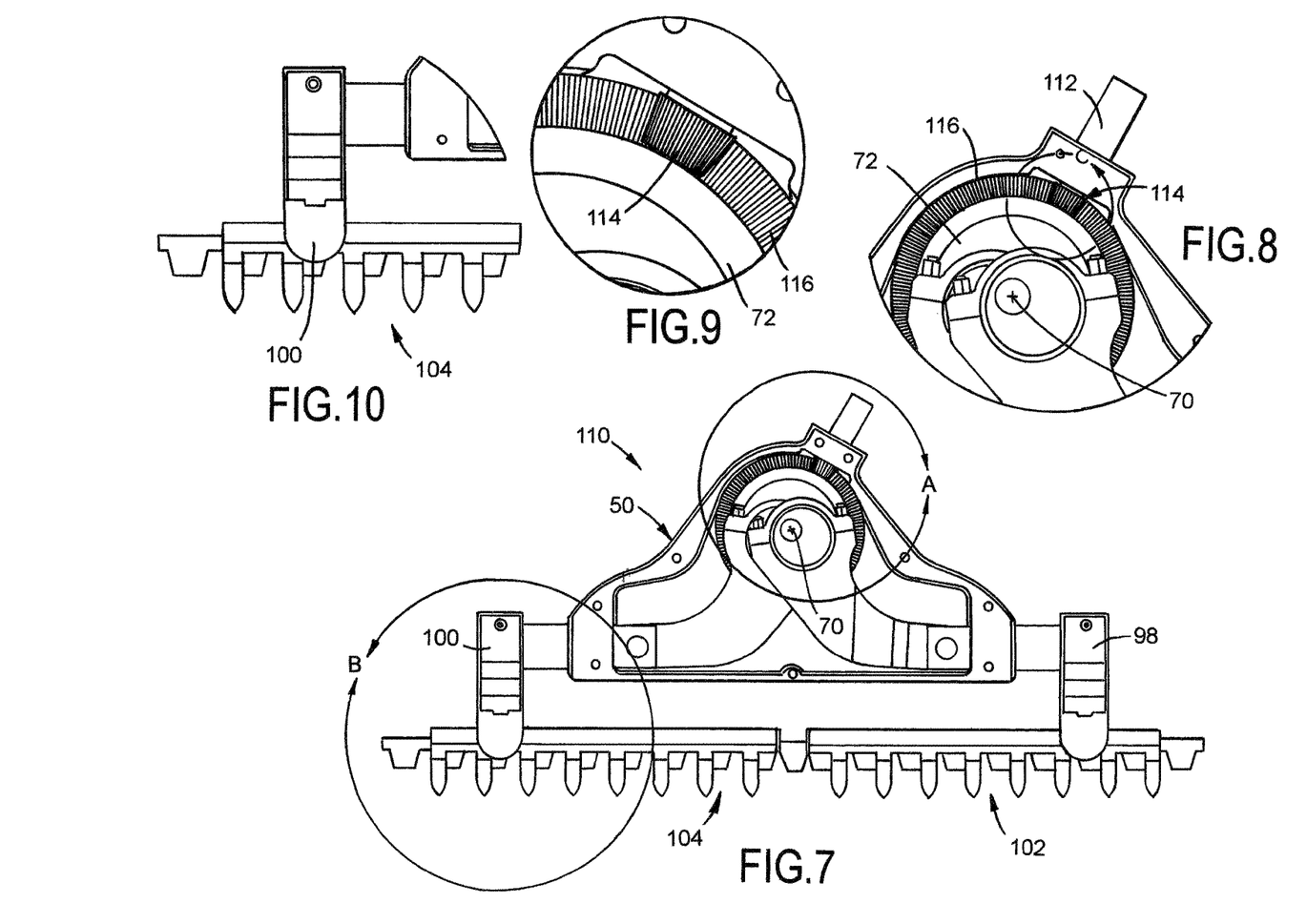
FIG. 7 is another top plan view of a cutter assembly according to an aspect of the subject application in fully extended position.
FIG. 8 is an enlarged partial view of Detail A of FIG. 7.
FIG. 9 is an enlarged partial view of Detail C of FIG. 8.
FIG. 10 is an enlarged partial view of Detail B of FIG. 7.

FIGS. 3 and 4 show a pair of plungers 82, 84 pivotably connected at first ends 86, 88 thereof e.g., via pivots 90, 92 to the second ends 78*b*, 80*b* of the eccentric rods or connecting members 78, 80. That is, the first plunger 82 is pivotably connected to the first connecting member 78 and the second plunger 84 is pivotably connected to the second connecting member 80. Second ends 94, 96 of the plungers 82, 84 are connected to first and second sickle knife assemblies. More particularly, the second ends of the plungers may be joined such as by clamping or the like to sickle bar coupler members 98, 100 which respectively are attached to first and second cutter bars or sickle knife blades 102, 104 (FIGS. 7 and 10). As seen in FIGS. 3-5, the first and second eccentric rods or first and second connecting members 78, 80 can be arcuate or curved in shape in order to more effectively convert rotational motion of crank shaft 60 into linear reciprocating or oscillating motion of the plungers 82, 84. The plungers 82, 84 are coaxially arranged with each other and are mounted for linear reciprocal or oscillating motion within the first and second opposite ends 54, 56 of housing 52. To facilitate sliding of plungers 82, 84 within the first and second opposite ends of the housing, there may be provided unillustrated bearings or bushings surrounding the plungers as well as seals for keeping oil within the housing.

Referring to FIG. 5, it will be seen that the first ends 78*a*, 80*a* of the first and second eccentric rods or connecting members 78, 80 include first clamping portions 78*c*, 80*c* and second clamping portion 78*d*, 80*d*. The first claiming portions 78*c*, 80*c* cooperatively engage with second clamping portions 78*d*, 80*d* e.g., via threaded members 78*e*, 80*e* and nuts 78*f*, 80*f* (FIG. 3) in order to form the completed eccentric sheaves 74, 76 shown in FIGS. 3 and 4. As will be appreciated, the second clamping portions 78*d*, 80*d*, are moved from a first non-clamping position when installing the connecting members 78, 80 to a second clamping position about journals 66, 68 upon completion of installation. That is, the second clamping portions 78*d*, 80*d* are moveable relative to the first clamping portions 78*c*, 80*d* between first and second positions for clamping of respective first and second journals 66, 68. In addition, as shown in FIG. 5, in order to promote longer service life of the knife drive 50, bearings 106 may be mounted within each of the first ends 78*a*, 80*a* of the first and second connecting members or eccentric rods 78, 80 between the first clamping portions 78*c*, 80*c* and the second clamping portions 78*d*, 80*d*.

Figure 6:
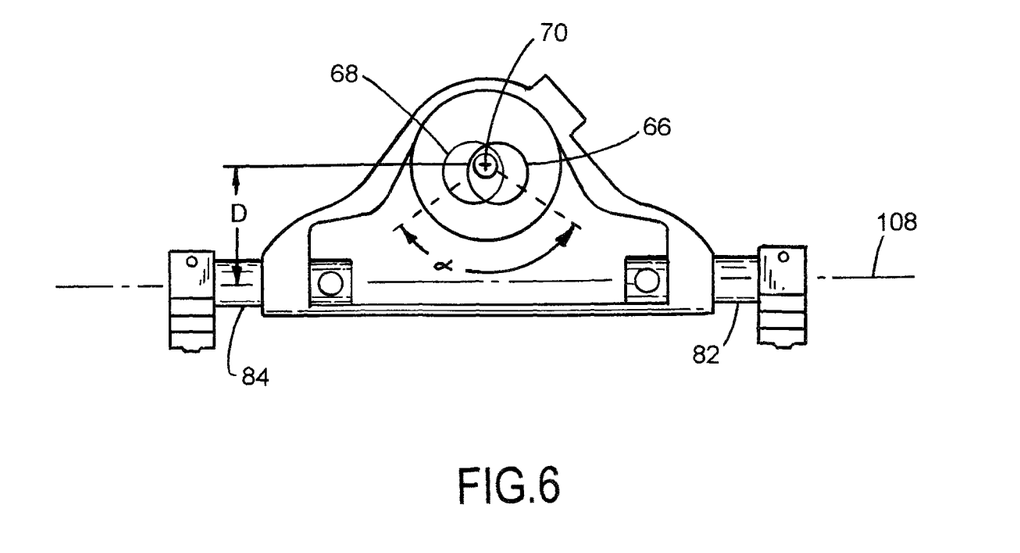
FIG. 6 is a view similar to FIG. 3 with certain elements of the knife drive omitted for clarity of illustration.

As mentioned above, according to the subject application rotational motion of crank shaft 60 is converted into linear reciprocating or oscillating motion of the plungers 82, 84. This is achieved by the radial and angular offset of the first and second journals 66, 68 situated on crank shaft 60 and their cooperation with the first and second eccentric rods 78, 80. Turning to FIG. 6, wherein the eccentric rods 78, 80 are omitted for clarity of illustration, the angular and radial offset of the first and second cylindrical portions or journals 66, 68 can be clearly seen. In particular, FIG. 6 shows that the first and second journals are radially offset with respect to the crank shaft rotation axis 70 so as to establish first and second cams that cooperatively engage with cam followers defined by the first and second eccentric sheaves 74, 76 shown in FIGS. 3 and 4. The first and second cams are thus eccentrically arranged with respect to the crank shaft.

According to an aspect of the subject application, the first and second cams can be matingly received within the cam followers in order to minimize vibration and assure smooth transition of rotational crank shaft motion into linear plunger motion. As noted, the first and second cams are angularly offset from each other about the crank shaft rotation axis. This angular or circumferential offset is indicated by angle "α" in FIG. 6. As seen in FIG. 6, the coaxially arranged first and second plungers 82, 84 define a common reciprocation axis 108 which is perpendicular to and spaced from the crank shaft rotation axis 70 by distance "D". Angle α ranges from about 90 to 180 degrees. That is, the cam surfaces of the first and second cams (i.e., the first and second eccentric journals 66, 68) that are furthest from the rotational axis of the crank shaft can be angularly or circumferentially spaced apart by about 90 to 180 degrees, but can be more or less than 90 or 180 degrees, such as 70, 80, 100, 100, 110, 120, 130, 140, 150, 160, 170, 190, and 200 degrees.

Referring to FIG. 7, there is shown a cutter assembly 110 constructed according to an aspect of the subject application. The cutter assembly 110 includes the center knife drive 50 to which is attached a pair of sickle bar coupler members 98, 100 which, in turn, are connected to a pair of cutter bars or knife blades 102, 104. An enlarged view of the connection between sickle bar coupler member 100 and cutter bar 104 is shown in FIG. 10. Cutter bars 102, 104 extend in opposite directions and are arranged in side by side relationship. As will be described below, cutter bars 102, 104 are coaxial and move in opposite directions in a linear reciprocating or oscillating path of motion e.g., the linear oscillation of the first and second cutter bars is simple harmonic motion.

FIG. 8 shows an enlarged view of a portion of knife drive 50, in particular the drive connection between flywheel 72 and a rotatable input shaft 112 which extends through housing opening 58 (FIGS. 3-5). Input shaft 112 may be driven by an unillustrated hydraulic motor or power take off in the manner known in the art. At its inner end the input shaft 112 carries a gear 114 which engages a corresponding gear 116 on flywheel 72. Thus, flywheel 72 operably engages the driven gear 114 of input shaft 112 to rotate the crank shaft. As most clearly seen in FIG. 9, the gears 114, 116 can be cooperating bevel gears. As seen in FIGS. 7 and 8, the bevel gear 116 on the face of the flywheel is coaxial with the crank shaft rotational axis 70. Although depicted as a bevel gear set, it will be understood that other gear arrangements, such as worm or pinion gears, may be suitable for achieving a driving connection between the input shaft 112 and the flywheel 72. Furthermore, although not illustrated, it is also contemplated that crankshaft 60, and therefore flywheel 72, may be directly driven by the output shaft of a drive motor, i.e., without the need for a geared connection.

Referring back to FIGS. 3 and 4, there is shown the operation of the sickle knife drive of the subject application with the plungers 82, 84 in the fully extended position (FIG. 3) and fully retracted position (FIG. 4). Plungers 82, 84 move between their end positions by virtue of rotation of the crank shaft. As noted above, crank shaft rotation may be achieved by a driving connection between input shaft 112 (FIG. 8) and flywheel 72. As the crank shaft rotates about axis 70, the flywheel 72 and the first and second cylindrical members or journals 66, 68 are likewise caused to rotate. During such rotation, the outer eccentric cam surfaces of the first and second journals travel inside and exert motive force i.e., cam against the first and second cam follower surfaces defined by the eccentric sheaves 74, 76. This force in turn urges the first ends of the first and second eccentric rods or connecting members 78, 80 to orbit in unison around the crank shaft rotation axis 70. During the course of such orbital motion, the first and second eccentric rods 78, 80 are reciprocatively pulled toward one another (FIG. 4) and pushed away from each other (FIG. 3) in equal and opposite directions in a simple harmonic motion fashion. These pulling and pushing forces is transmitted to the plungers 82, 84 and ultimately to the cutter bars attached to the knife drive. By being constrained only to linear reciprocating or oscillating motion the plungers transmit such linear motion to the cutter bars such that fore and aft cutter bar motion and corresponding fore and aft vibrations are essentially eliminated. Additionally, by virtue of the second ends of the first and second connecting members moving in equal and opposite directions, lateral vibration is minimized thereby resulting in essentially a vibration-free cutter assembly.

It will be appreciated by those skilled in the art that changes could be made to the aspects described above without departing from the broad inventive concept thereof. It is to be understood, therefore, that the subject application is not limited to the particular aspects disclosed, but it is intended to cover modifications within the spirit and scope of the subject application as defined by the appended claims.

I claim:

1. A cutter assembly for an agricultural harvester header comprising:
   a knife drive that includes:
   a housing,
   a crank shaft having:
   a flywheel,
   a first rotatable portion directly attached to the flywheel, and
   a second rotatable portion radially offset from the first rotatable portion and directly attached to the first rotatable portion,
   a first rod matingly mounted to the first rotatable portion, and a first plunger extending from the first rod and through the housing, and
   a second rod matingly mounted to the second rotatable portion, and a second plunger extending from the second rod and through the housing;
   wherein the first and second rods extend in opposite directions and have distal ends connected to respective pivot connections,
   a first cutter bar attached to the first plunger; and
   a second cutter bar attached to the second plunger,
   wherein rotation of the crank shaft oscillates the first and second cutter bars.

2. The cutter assembly of claim 1, wherein the first and second rotatable portions are angularly offset from each other with respect to a rotational axis.

3. The cutter assembly of claim 2, wherein the first and second rotatable portions are angularly offset from each other about 90-180 degrees.

4. The cutter assembly of claim 2, wherein the first and second rotatable portions are angularly offset from each other about 90 degrees.

5. The cutter assembly of claim 2, wherein the first and second rotatable portions are angularly offset from each other less than 90 degrees.

6. The cutter assembly of claim 1, wherein the first and second cutter bars are in side by side relation.

7. The cutter assembly of claim 1, wherein the first rod is clamped on the first rotatable portion.

8. The cutter assembly of claim 1, wherein the first and second rods are curved.

9. The cutter assembly of claim 1, wherein the flywheel includes a gear having teeth.

* * * * *